US012439201B2

(12) United States Patent
Jancovich

(10) Patent No.: US 12,439,201 B2
(45) Date of Patent: Oct. 7, 2025

(54) NARROW APERTURE WAVEGUIDE LOUDSPEAKER FOR USE WITH FLAT PANEL DISPLAY DEVICES

(71) Applicant: Dolby Laboratories Licensing Corporation, San Francisco, CA (US)

(72) Inventor: Benjamin Alexander Jancovich, Arncliffe (AU)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 177 days.

(21) Appl. No.: 18/550,197

(22) PCT Filed: Apr. 14, 2022

(86) PCT No.: PCT/US2022/024897

§ 371 (c)(1),
(2) Date: Sep. 12, 2023

(87) PCT Pub. No.: WO2022/221582

PCT Pub. Date: Oct. 20, 2022

(65) Prior Publication Data

US 2024/0314494 A1 Sep. 19, 2024

Related U.S. Application Data

(60) Provisional application No. 63/174,797, filed on Apr. 14, 2021.

(30) Foreign Application Priority Data

Apr. 14, 2021 (EP) .................................... 21168313

(51) Int. Cl.
*H04R 1/34* (2006.01)
*H04R 1/28* (2006.01)

(52) U.S. Cl.
CPC ........... *H04R 1/345* (2013.01); *H04R 1/2811* (2013.01); *H04R 2499/15* (2013.01)

(58) Field of Classification Search
CPC ........ H04R 1/34; H04R 1/345; H04R 1/2811; H04R 2499/15
See application file for complete search history.

(56) References Cited

U.S. PATENT DOCUMENTS

| | | | |
|---|---|---|---|
| 3,105,113 | A | 9/1963 | Olson |
| 4,102,195 | A | 7/1978 | Thompson |
| 4,344,504 | A | 8/1982 | Howze |
| 5,274,709 | A | 12/1993 | Koizumi |

(Continued)

FOREIGN PATENT DOCUMENTS

| | | | |
|---|---|---|---|
| EP | 2293596 | B1 | 9/2014 |
| EP | 2922050 | A1 | 9/2015 |

(Continued)

*Primary Examiner* — Mark Fischer

(57) ABSTRACT

A speaker having a narrow aperture waveguide for transmitting sound from the rear side of a flat display panel. A transducer of the speaker radiates sound through the waveguide and outwards from the rear of the display panel and around an edge of the display panel to form soundwaves radiating directly or nearly directly to a listener positioned in front of the display panel. The waveguide includes fins that control the directivity of soundwaves exiting the waveguide and around the edge of the display panel.

15 Claims, 12 Drawing Sheets

(56) References Cited

U.S. PATENT DOCUMENTS

| | | | |
|---|---|---|---|
| 5,793,000 A | | 8/1998 | Sabato |
| 6,059,069 A | | 5/2000 | Hughes, II |
| 6,112,847 A | | 9/2000 | Lehman |
| 6,223,853 B1 | | 5/2001 | Huon |
| 6,394,223 B1 | | 5/2002 | Lehman |
| 6,581,719 B2 | | 6/2003 | Adamson |
| 6,585,077 B2 | | 7/2003 | Vincenot |
| 6,668,969 B2 | | 12/2003 | Meyer |
| 6,668,974 B1 | | 12/2003 | Mottelet |
| 7,010,138 B1 | | 3/2006 | Harris |
| 7,278,513 B2 | | 10/2007 | Brawley, Jr. |
| 8,479,873 B2 | | 7/2013 | Dodd |
| 8,761,425 B2 | | 6/2014 | Donarski |
| 9,245,513 B1 | | 1/2016 | Dimitrov |
| 10,432,767 B2 | * | 10/2019 | Pellegrino ............. H04M 1/035 |
| 2008/0128199 A1 | | 6/2008 | Magalotti |
| 2011/0037906 A1 | | 2/2011 | Gawronski |
| 2014/0367193 A1 | | 12/2014 | Center |
| 2015/0078605 A1 | | 3/2015 | Yang |
| 2018/0310095 A1 | | 10/2018 | Wyer |
| 2020/0029150 A1 | | 1/2020 | Croft, III |
| 2020/0137483 A1 | | 4/2020 | Mäkivirta |
| 2022/0394377 A1 | | 12/2022 | Tipparaju |

FOREIGN PATENT DOCUMENTS

| | | | |
|---|---|---|---|
| FR | 2913847 | B1 | 12/2009 |
| JP | 04-023697 | A | 1/1992 |
| JP | 2009-65609 | A | 3/2009 |
| JP | 2016-32254 | A | 3/2016 |
| JP | 6644755 | B2 | 2/2020 |
| KR | 102097891 | B1 | 4/2020 |
| KR | 102116466 | B1 | 5/2020 |
| WO | 20200176421 | A1 | 9/2020 |

* cited by examiner

NARROW APERTURE WAVEGUIDE LOUDSPEAKER FOR USE WITH FLAT PANEL DISPLAY DEVICES

CROSS-REFERENCE TO RELATED APPLICATIONS

This application is a U.S. National Stage application under U.S.C. 371 of International Application No. PCT/US2022/024897, filed on Apr. 14, 2022 which claims priority to U.S. Provisional Application No. 63/174,797, filed Apr. 14, 2021 and EP Application Serial No. 21168313.1, filed Apr. 14, 2021, all of which are incorporated herein by reference in their entirety.

TECHNICAL FIELD

Embodiments relate generally to an audio speaker comprising a waveguide with a narrow aperture and a method of assembly of such an audio speaker.

BACKGROUND

Products in the commercial electronics sector have been moving towards ever thinner, lighter, and sleeker industrial designs. This is especially true in the case of display screens or monitors for desktop and portable computers, as well as televisions, gaming consoles, and so on. The aspiration amongst industrial designers is to have the display panel extend right to the edge of the product housing, with very little bezel area, i.e., material extending above, below and to the sides of the viewable screen area.

Display screens usually have integrated or closely coupled speakers to allow for playback of sound as well as visual content. Integrating speakers in a display eliminates the need to provide separate speaker enclosures, and also allows designers to place the speakers so that the sound seems to emanate from the near region of the visual plane of the display. However, present design trends in displays are severely constraining the ability to integrate high quality speakers. Modern flat panel display screens are typically too thin to accommodate integrated, forward facing speakers around the edge of the display panel, due to the width of the speaker cones and voice coils. Likewise, the lack of volume within these thin displays limits the acoustic back-volume to produce satisfactory low frequency content. Thus, integrated audio/visual (A/V) flat panel monitors usually rely on externally mounted speakers, or speakers mounted to the back or underside of the display.

This type of external speaker packaging is an impediment to implementation of high fidelity audio systems because such back or underside mounted speakers typically do not fire directly towards the listener, as forward firing external speakers would need to be installed on the edges of the display or add significantly to the bezel area. As speakers are generally more directional at higher frequencies, speakers that do not point directly towards the listener are not optimal for high fidelity audio playback, both in terms of frequency response and spatial rendering of stereo and surround content. These, and other limitations need to be addressed in order to enhance the playback quality for flat panel mounted speakers.

SUMMARY OF EMBODIMENTS

Embodiments include a speaker having a narrow aperture waveguide for transmitting sound from the rear side of a flat display panel. A transducer of the speaker radiates sound through the waveguide and outwards from the rear of the display panel and around an edge of the display panel to form soundwaves radiating directly or nearly directly to a listener positioned in front of the display panel. The waveguide includes fins that control the directivity of soundwaves exiting the waveguide and around the edge of the display panel Embodiments are further directed to a speaker for use in or with a flat panel display having a transducer, a waveguide attached to the transducer, and having an increasing cross sectional aspect ratio and area, and an aperture portion attached to or formed in the waveguide and comprising a curved tube section. The waveguide has a number of passages formed within it that are configured to direct sound from the transducer and through the aperture to be transmitted from an edge of a flat panel display substantially perpendicular to a front surface of the flat panel display when the transducer is attached to the flat panel display in an outward firing configuration. The passages are formed from a set of transverse and optional longitudinal fins forming an array or lattice structure within the waveguide. Resonators may be provided to eliminate or minimize the resonance created within the waveguide. The aperture portion has an aspect ratio substantially greater than that of the transducer to provide a narrow aperture speaker.

Embodiments are yet further directed to a method of directing sound waves directly to a user from speakers installed in or mounted on the back of a display panel by providing a speaker with a waveguide attached to a transducer, the waveguide having an increasing cross sectional aspect ratio and area, forming an aperture portion comprising a curved tube section, and forming, within the waveguide a plurality of passages directing sound from the transducer and through the aperture to be transmitted from an edge of the display panel in a direction substantially perpendicular to a front surface of the display panel.

Such embodiments provide a way to make a relatively large speaker, installed in the back of the display panel, sound to the listener as though it were front firing. It also minimizes the negative effect on the industrial design of modern display panels by preventing visual clutter involved with packaging front firing speakers in flat panel displays.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

Figure 1A:
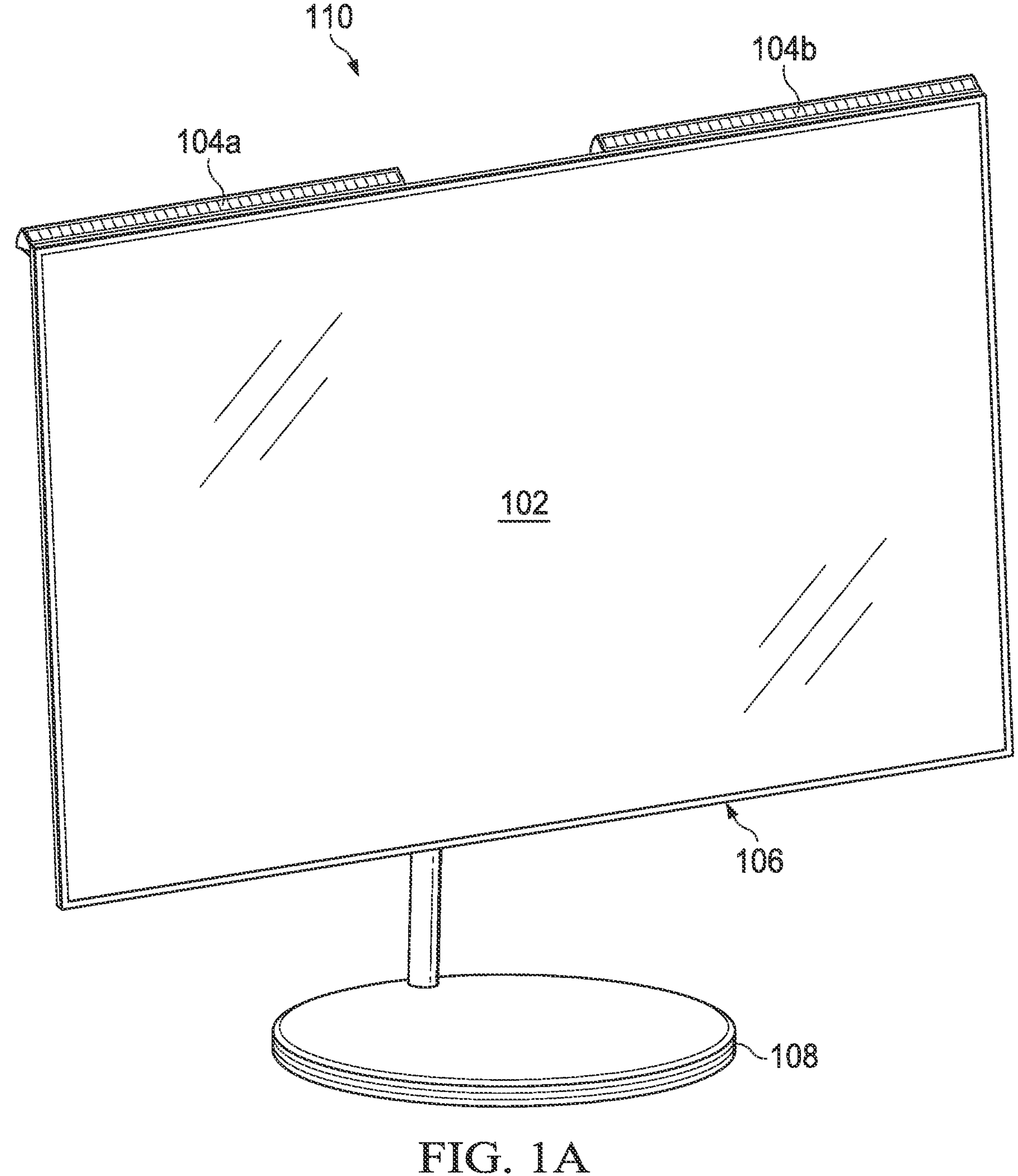
FIG. 1A illustrates a front perspective view of a display panel including rear mounted narrow aperture speakers directing soundwaves toward a user, under some embodiments.

Embodiments are directed to a curved loudspeaker waveguide for integrating in or mounting to the back of a flat panel display to direct soundwaves up and around the top edge of the display panel and toward a user. Any of the described embodiments may be used alone or together with one another in any combination. Although various embodiments may have been motivated by various deficiencies with the current and known solutions, which may be discussed in the specification, the embodiments do not necessarily address any of these deficiencies. Different embodiments may address different deficiencies, and some may only be partially addressed.

For purposes of the present description, the following terms have the associated meanings: the term "speaker" or "loudspeaker" means an audio playback speaker having a cabinet or provided in an enclosure enclosing one or more drivers, where the term "driver" means an individual audio transducer that converts an electrical audio signal into sound waves, and may be implemented as a cone, dome, compression driver, micro-speaker, or planar driver, and may be a full-range driver or a driver configured to playback a certain frequency range, such as a tweeter, mid-range driver, woofer, sub-woofer, and so on. The term "cabinet" means a speaker enclosure or box that houses the transducer or transducers (or drivers) and that is typically wholly enclosed to acoustically isolate the rear of the transducers, but that may also be vented or partially open if needed for certain audio response characteristics. The term "waveguide" means a hollow structure attached to a transducer to guide soundwaves produced by the transducer out in a desired direction or radiation pattern, the classical example being a horn. The term "listening environment" means any open, partially enclosed, or fully enclosed area, such as a room that can be used for playback of audio content alone or with video or other content from any appropriate source, and can be embodied in a home, cinema, theater, auditorium, studio, game console, and the like.

The term "display" or "monitor" means an electronic display device showing visual content, and can include liquid crystal display (LCD), light emitting diode (LED), plasma panels, electroluminescent panels, and other types of LED technology (e.g., organic LED, Quantum dot LED), and so on.

With respect to audio signals and content, the term "channel" means an audio signal plus metadata in which the position is coded as a channel identifier, e.g., left-front or right-top surround: "channel-based audio" is audio formatted for play back through a pre-defined set of speaker zones with associated nominal locations, e.g., 5.1, 7.1, and so on (i.e., a collection of channels as just defined); the term "object" means one or more audio channels with a parametric source description, such as apparent source position (e.g., 3D coordinates), apparent source width, etc.; "object-based audio" means a collection of objects as just defined; and "immersive audio," (alternately "spatial audio" or "adaptive audio") means channel-based and object or object-based audio signals plus metadata that renders the audio signals based on the playback environment using an audio stream plus metadata in which the position is coded as a 3D position in space.

Embodiments are described for a speaker design that allows a speaker mounted to the back of the display panel to sound as though it were projecting directly (front-firing) to a listener positioned in front of the display panel. The speaker has a waveguide structure through which sound projected from the transducer exits the speaker. The waveguide has a mouth or aperture that is formed as a thin, longitudinal opening, herein referred to as a 'narrow aperture' that provides minimal structural limitation to flat panel display designs.

Embodiments are directed to speakers used in flat panel displays or monitors for computers, game consoles, workstations, and other A/V playback devices that are typically placed on a desk or table where the user (listener) is typically seated and positioned about one to five feet away and directly in front of the display. Such displays are typically of a size ranging from 15 inches to 27 inches diagonal, but have a thickness of less than one inch, in the case of modern displays. Although described with respect to computer displays, embodiments are not so limited and may be applied to television displays, home entertainment systems, and so on with display panels that may be of a much bigger size, although of near equal thickness.

As stated previously, the modern displays used in or with computers, televisions, and other A/V devices feature display panels that pose significant challenges to audio playback systems due to their flat thin form factor and packaging. Such displays that incorporate speakers themselves often suffer from poor audio quality due to tight packaging and the simple lack of space and volume for speaker response across a wide frequency range. Moreover, the trend toward sleek designs with minimal bezel size and uncluttered front panels means that openings for speakers (along with switches, and so on) are often removed, thus further complicating providing front firing speakers in flat panel displays.

Embodiments include a loudspeaker configured to be attached to the back of a display panel with a waveguide directs sound outward (e.g., upwards) and around an edge (e.g., the top) of the display panel directly or substantially directly toward the listener positioned in front of the display, where substantially directly means that more audio signal is directed along the horizontal plane of the user's eyeline, rather than vertically up toward the ceiling above the user, down toward the floor, or sideways toward the walls of the listening environment. FIG. 1A illustrates a front perspective view of a display panel including one or more rear mounted narrow aperture speakers directing soundwaves toward a user, under some embodiments. As shown in FIG. 1A, system 110 includes a flat display panel 102 for use with a desktop computer or similar processing or A/V play back device. The panel may be on the order of 15 inches to 27 inches in diagonal length, though any practical size is possible. The example display panel 102 of FIG. 1A includes a stand 108 for placement on a table, desk, or other similar surface or furnishing. The display panel 102 may be a passive display device for use with a separate central processing unit (CPU) or A/V rendering device, or it may be an integrated all-in-one computer, such as an Apple iMac or similar computer. The display panel 102 is characterized by having a flat rectangular plan dimension and a thin side profile constituting a width on the order of less than one inch, with minimal bezel (surround) area 106. Because of the minimal bezel area, controls and interface area is limited to the extreme edges of the device and/or the back surface of the device.

A display device such as that illustrated in FIG. 1A typically does not have any internal speakers contained within its housing, or it may contain only minimal speakers for play back of alerts or rudimentary effects. To reproduce quality audio, such as music, dialogue, sound tracks or other high fidelity audio, external speakers are often used. To provide an integrated, self-contained product, designers and manufacturers may attach one or more speakers to the back side of the display panel. Such external speakers can be configured and placed to direct their audio sound waves out of the top, bottom, or sides of the display device. If they are installed so as to project sound directly at the user, they must protrude out of the top, side or underside of the display panel as front-firing speakers, or incorporated into a larger area of the front panel (e.g., a 'chin') or enlarged bezel area. Such a protrusion or visible speaker may be undesirable from a product or industrial design perspective since it disturbs or clutters the smooth lines of the simple narrow/no bezel display panel.

FIG. 1A illustrates a display panel with two pairs of speakers, 104*a*, 104*b*, that are mounted on the back side of the display panel 102, and provide front-firing capability while minimizing any cluttering of the display panel itself. Speakers 104*a* and 104*b* each feature a curved waveguide that direct sound waves up and around the top edge of the display panel 102 so that they project substantially directly toward the user.

Figure 1B:
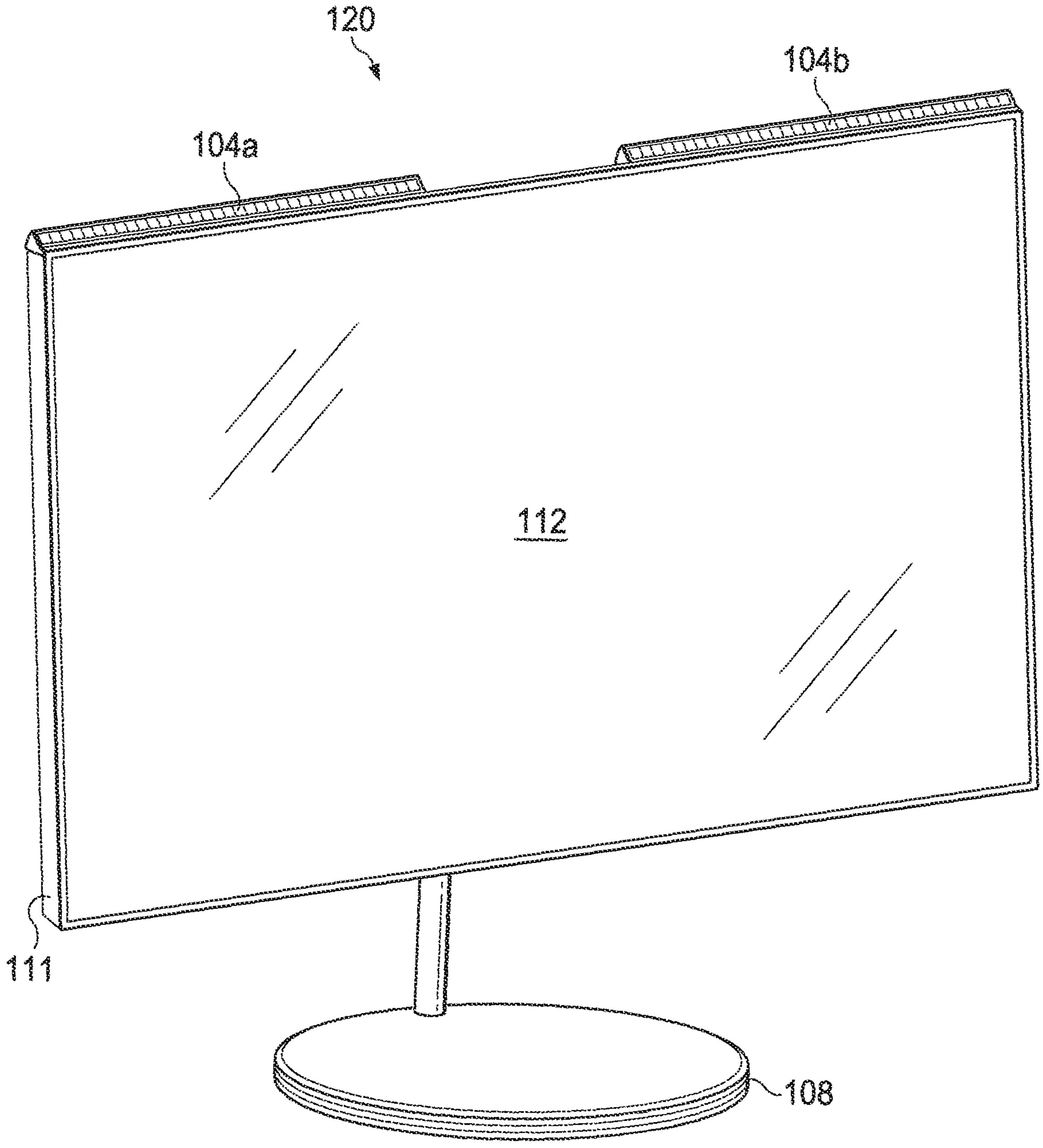
FIG. 1B illustrates a display panel that includes top-mounted, narrow aperture speakers as integrated units within the display panel, under some embodiments.

For thin display panels where sufficient room is provided, the speakers 104*a*, 104*b* may be integrated within the cabinet of the display panel. FIG. 1B illustrates a display panel system 120 that includes the top, forward-firing speakers as integrated units within the display panel, under some embodiments. For this embodiment, the display panel 112 has a width 111 that, at least in part, has a thickness that provides enough internal volume to accommodate speakers 104*a* and 104*b* to be mounted inside of the panel enclosure.

Although embodiments are shown and described with respect to upward firing drivers, and the directing of soundwaves around a top edge of the display panel, as shown in FIGS. 1A and 1B, it should be noted that embodiments are not so limited and speakers can be placed and configured project sound outward and around any of the top, bottom, left or rights sides, or corners of the display panel.

Figure 2:
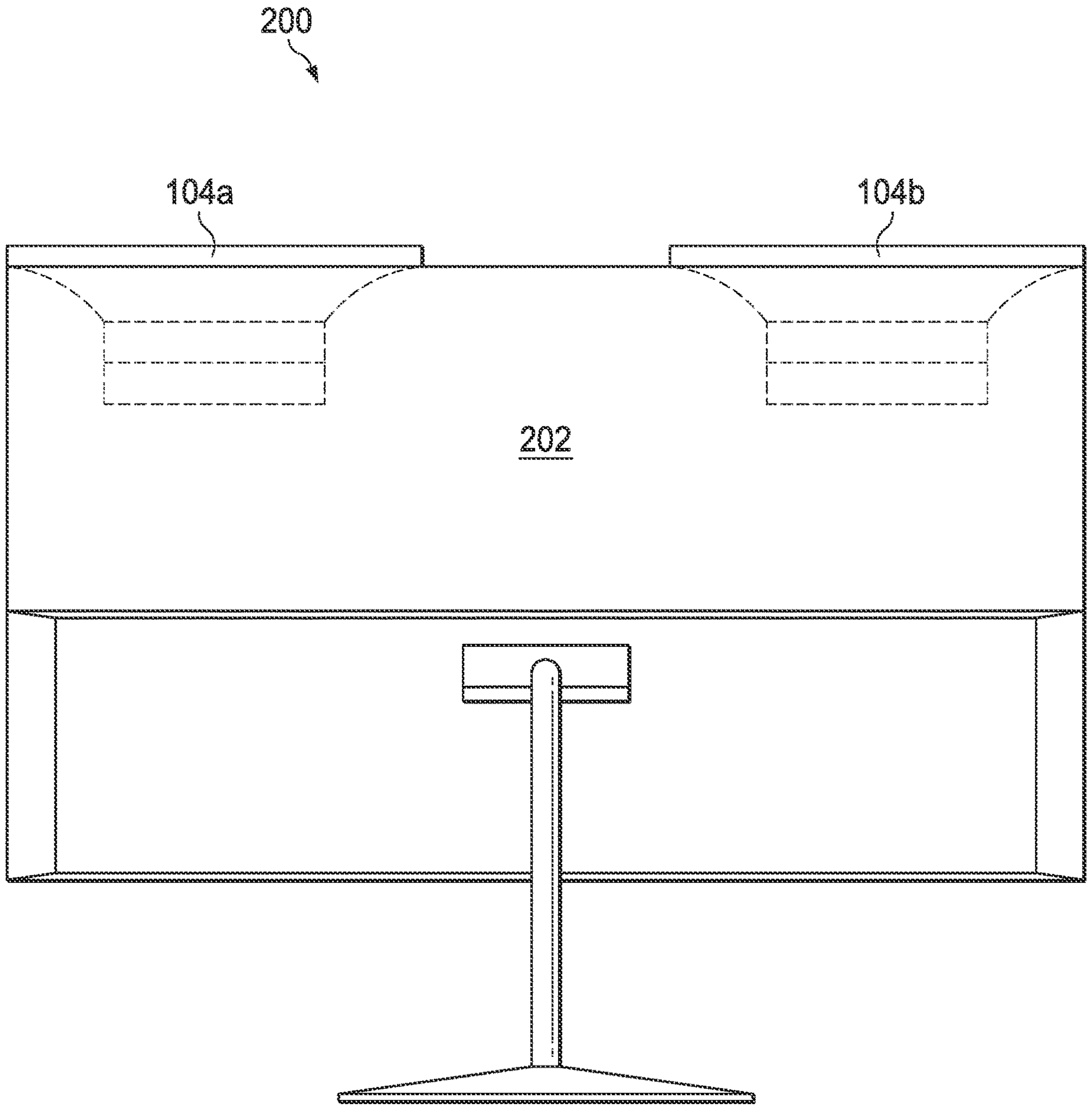
FIG. 2 illustrates a rear view of the display panel of FIG. 1B, under some embodiments.

FIG. 2 illustrates a rear view of the display panel of FIG. 1B, under some embodiments. As shown in FIG. 2, speakers 104*a*, 104*b* are mounted inside of display panel 202. These speakers can be configured to direct their audio sound waves out of the top of the display device. Similar speakers may be provided and configured to project sound out of the sides or bottom of the display device, but for purposes of description embodiments will be described with respect to internally installed, top-mounted, forward-firing speakers, although embodiments are not so limited.

For the example embodiment of FIGS. 1A and 1B, the upper speakers 104*a* and 104*b* are shown as being mounted within the panel enclosure 202 such that the uppermost portion of the speaker waveguide (referred to as the speaker 'mouth' or 'aperture') protrudes minimally past the border or edge of the display panel. To conform to simple and clean design constraints, this uppermost portion would be flush or near flush with the upper edge, however, some amount of protrusion, such as on the order of several millimeters or less may be provided. To prevent the soundwave direction of the upper speakers from being directed entirely upward from the display panel, embodiments of speakers 104*a* and 104*b* include a waveguide that is shaped and configured to direct sound up and around the upper edge of display panel 112. Thus, as shown in FIGS. 1A and 1B, the mouth of each speaker 104*a* and 104*b* can be seen to project at some angle out from the front of display panel 102 or 112 rather than straight up toward the ceiling.

Figure 3:
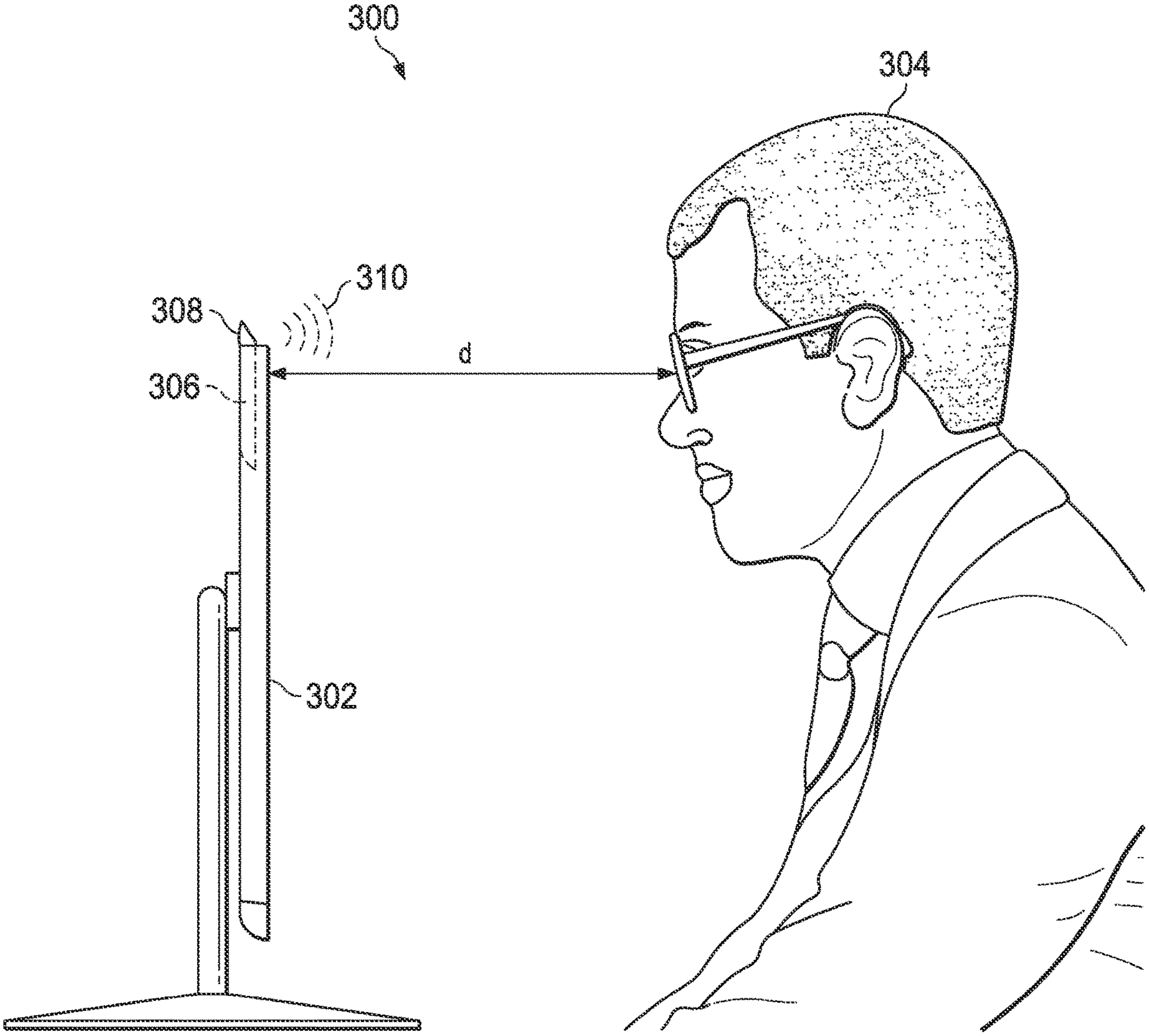
FIG. 3 illustrates a side view of the display panel of FIG. 1B and relative to user, under an example embodiment.

FIG. 3 illustrates a side view of the display panel of FIG. 1 and relative to a user, under an example embodiment. As stated earlier, the display panel can be configured to be used with a desktop computer or similar device in relatively close proximity to a user. For the embodiment shown in FIG. 3, the display panel 302 is located at a specified distance d from user 304 who is roughly at even eye level to the top edge of the display panel. Speaker 306 (representing one of the upper speakers 104*a* or 104*b*) includes an upper waveguide portion 308 that directs soundwaves 310 to radiate out along an axis parallel or substantially parallel to the viewing axis of the user. Thus, sounds emanating from the speaker 306 will not be directed straight up and out from the speaker, but will rather sound like they are coming from the front of the display panel.

For a computer implementation, the distance d may be on the order of one to five feet depending on display size, room size, use case, and so on. Any other scale is possible however, such as for televisions, home entertainment systems, public viewing systems, and so on. FIG. 3 is provided for purposes of illustration only, and it should be noted that any other practical position of user 304 relative to the display panel 302 and the speakers 306 is possible.

In present systems with only upward firing speakers, the directivity of the soundwaves will generally be too narrow at high frequencies. A listener seated or positioned directly in front of the screen will thus not be able to hear high frequencies as well as in the case where the soundwaves were directed at the user. Accurate high frequency reproduction is important not only for timbral fidelity and speech intelligibility but is also for perception of virtualized height cues in immersive audio applications. To overcome this limitation, embodiments of the speaker 306 includes a waveguide 308 with a narrow aperture and an internal fin arrangement to direct soundwaves 310 up and around the edge of the display 302 and towards the listener 304. The speaker 306 features a form factor so that the front facing acoustic aperture (or waveguide mouth) 308 has a low vertical profile relative to the height of the display 302, so as to fit within industrial design constraints of the display screen. That is, it does not protrude excessively beyond the top edge of the display, nor does it require increased bezel area around the display.

Figure 4:
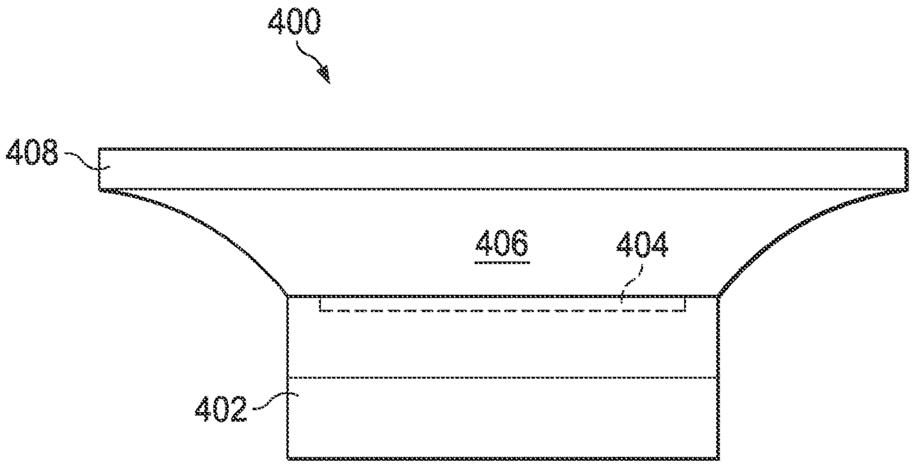
FIG. 4 illustrates a rear view of a narrow aperture speaker, under some embodiments.

FIG. 4 illustrates a front view of a narrow aperture speaker, under some embodiments. As shown in FIG. 4, speaker 400 comprises a transducer and enclosure section 402 with a diaphragm 404 that projects sound upwards into waveguide section 406. The waveguide 406 is configured to have an increasing cross-sectional area and increasing cross sectional aspect ratio as shown with the upper dimension of the mouth 408 of the waveguide longer than the lower portion coupled to the transducer 402. This increased cross-section configuration provides an impedance matching mechanism, as in traditional horn designs, to increase sensitivity and to also help control and achieve a desired directivity of soundwaves out of the mouth portion 408 of the speaker 400.

The transducer 402 may be of any shape suitable for use with the narrow aperture such as oblong or rectangular in shape and it may function as any one or more of a tweeter, mid-range driver, or woofer.

Figure 5A:
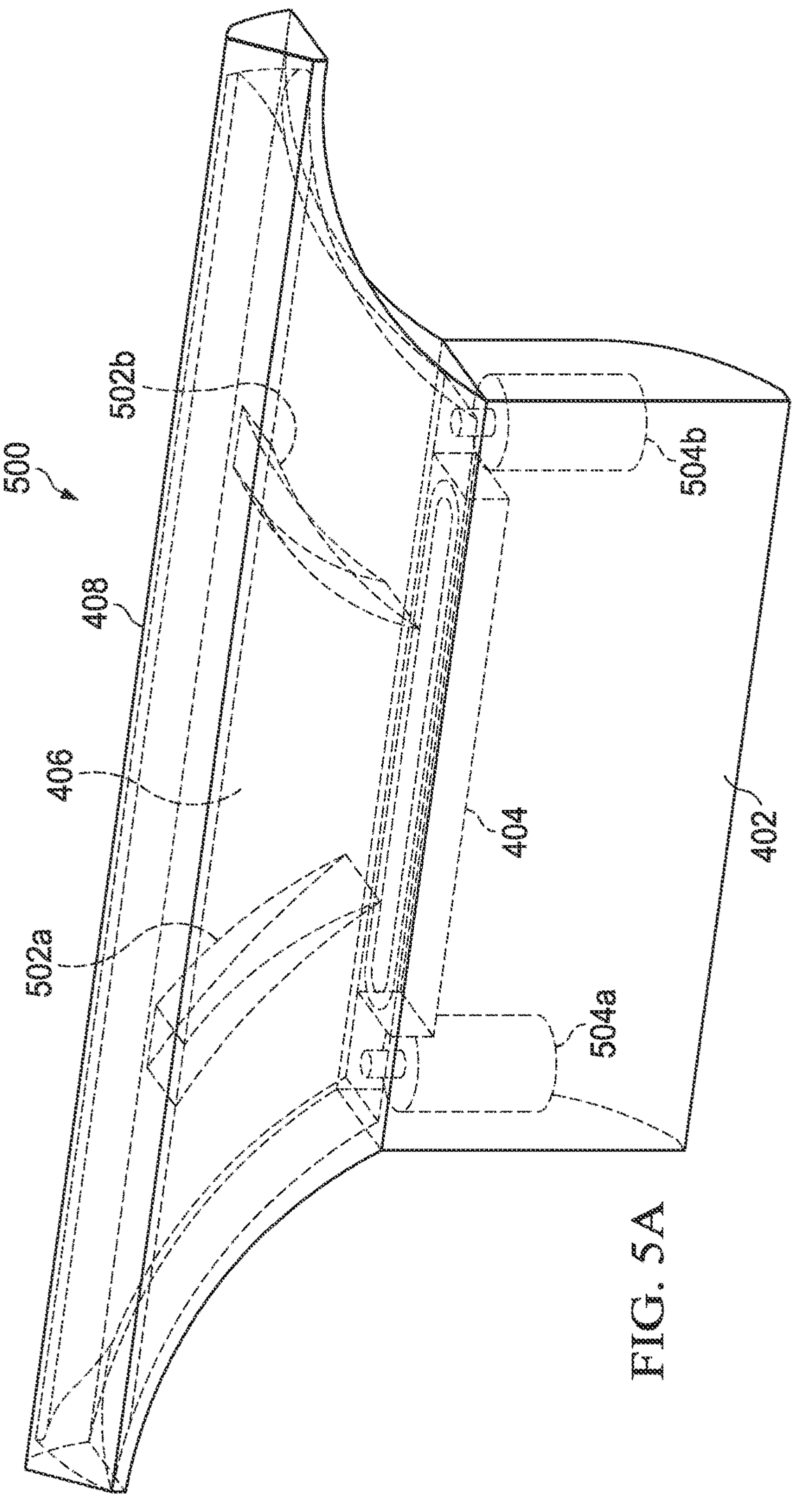
FIG. 5A is a perspective cutaway view of the speaker of FIG. 4 under an embodiment.

FIG. 5A is a perspective cutaway view of the speaker of FIG. 4 under an embodiment. Speaker diagram 500 shows the enclosure 402 with waveguide 406 mounted above the transducer 404. The top of the waveguide 406 has an angled aperture portion 408 directing soundwaves outward through the narrow aperture at an angle off of the vertical axis of the diaphragm of the transducer 404. For the embodiment of FIG. 5A, the transducer portion 402 includes a pair of Helmholtz resonators 504*a* and 504*b*.

In general, the use of waveguide 406 produces possible resonances within the waveguide, thus perturbing the frequency response. These resonances occur due to the constructive and destructive interference of waves bouncing back and forth along the long axis of the waveguide. To dampen this resonance, the resonators 504*a* and 504*b* are used. An example resonator is a Helmholtz resonator that has a neck and volume element that store acoustic energy within a narrow frequency range, and dissipate it over time. This temporal spreading of the acoustic energy reduces the instantaneous magnitude and Q-factor of a resonance peak. In an embodiment, any resonator that works as an acoustic filter element can be used which, when precisely tuned, mitigates the undesirable waveguide resonance from the total response of the speaker 500. Thus, the resonator can be designed as either a Helmholtz resonator design or a quarter wave resonator, or similar design.

Figure 6:
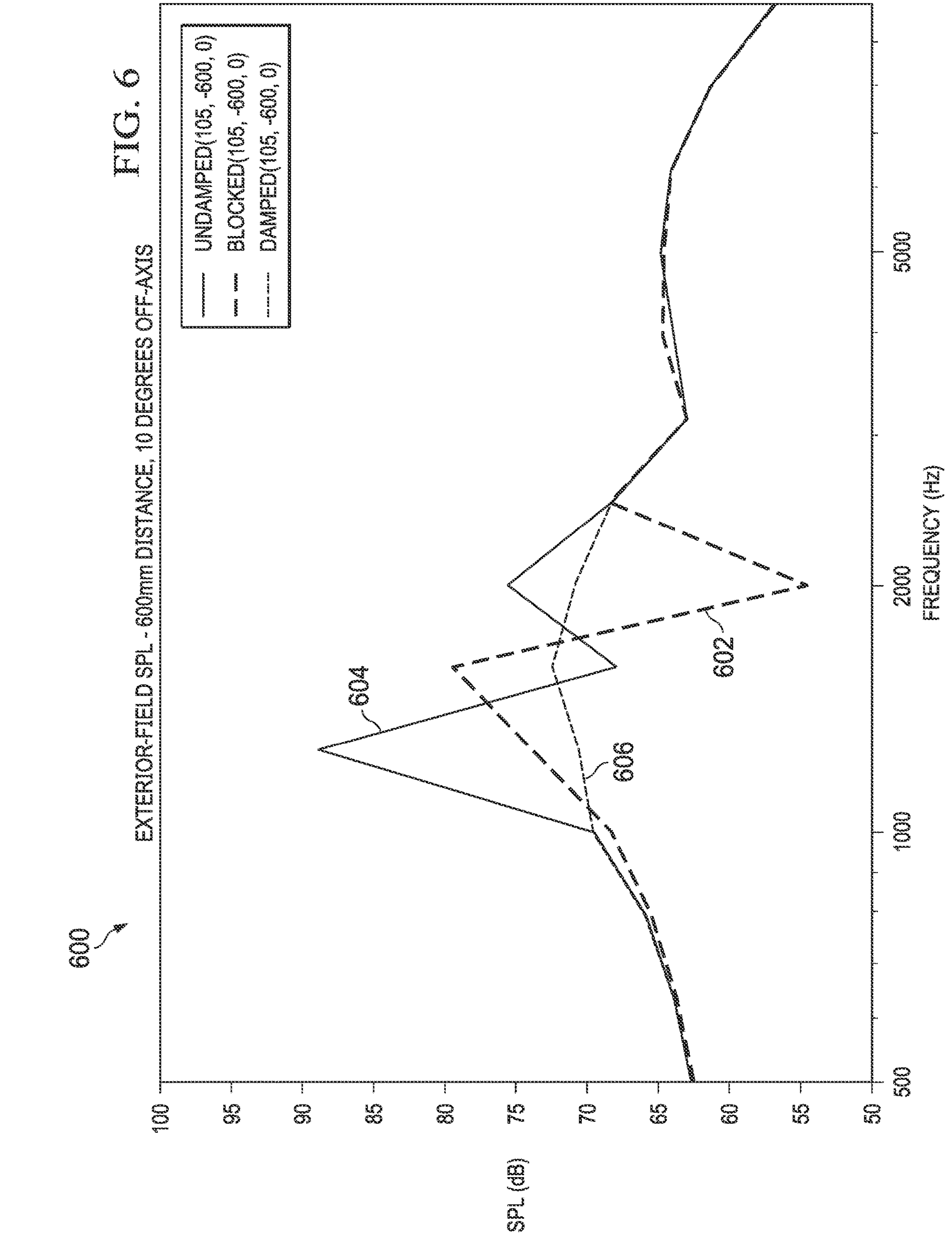
FIG. 6 is an example frequency response curve showing the effects of a resonator in a waveguide speaker, under some embodiments.

FIG. 6 is an example frequency response curve showing the effects of a resonator in a waveguide speaker, under some embodiments. Diagram 600 of FIG. 6 illustrates the sound pressure level (SPL) in decibels (dB) versus frequency (in Hz) for different configurations of speaker 500 under some example resonator configurations. The example plots show the frequency response at a listener's ear position when seated at 600 mm distance from the display panel housing speaker. As shown in FIG. 6, plot 602 illustrates an example frequency response for the waveguide with no acoustic resonance correction, i.e., speaker 500 without resonators 504*a* and 504*b*, and plot 604 illustrates the frequency response when using empty Helmholtz resonators with the waveguide. As can be seen the SPL peaks of plot 602 due to resonance within the waveguide are attenuated with respect to plot 604, however an additional resonance is introduced, shifted down in frequency. Plot 606 illustrates the frequency response of a damped resonator configuration in which damping material is added to the inside of the resonator cavity. As can be seen in FIG. 6, there is noticeable reduction in the resonant peaks of the SPL level in the damped resonator configuration. Any appropriate damping material may be used, such as polyester fiber, rockwool, and the like.

As is known in the field of audio engineering, speakers tend towards unidirectional radiation at higher frequencies. As shown in FIG. 5A, the transducer of speaker 500 approaches a line source, due to its high aspect ratio (i.e., a relatively narrow shape for transducer length versus width). This means that above the beaming frequency, the wavefront propagates in a cylindrical shape, whose length is approximately defined by the transducer length. Beaming generally refers to a changes in radiation pattern with frequency, where higher frequencies are radiated more narrowly than lower frequencies. The beaming frequency is defined as $f=(2*c)/(\pi*D)$, wherein f is the frequency where the speaker starts to beam (Hz), 'c' is the speed of sound (343 m/s), and 'D' is the effective diameter of the speaker (m). Embodiments of the narrow aperture speaker help to effectively raise the beaming frequency, f, to allow appropriate directivity for use with design constrained flat panel displays.

For the embodiment of FIG. 5A, the waveguide aperture 408 is much longer and thinner than the transducer, but at higher frequencies, the majority of the pressure front travels straight up through the middle of the waveguide 406. The cylindrical propagation front does not spread or lengthen along the waveguide, resulting in an unacceptably narrow directivity pattern (e.g., <10°) at high frequencies (e.g., >12 kHz) in the horizontal plane. To control the propagation of the wavefront at high frequencies, the waveguide 406 includes certain fin structures 502*a* and 502*b* within the inside of the waveguide. These fins form curved passages that partition the wavefront up and guide it out such that the wavefront at the aperture end is longer than at the speaker diaphragm. The different path lengths of the passages also result in a curving of the wavefront. This occurs because the speed of propagation is constant, but the path length differences between the passages result in increasingly late aperture arrival times towards the edges of the waveguide. This results in a bending of the wavefront, making it more spherical.

As is evident from FIG. 5A, the fins may have an increasing thickness as the waveguide extends away from the transducer.

Figure 5B:
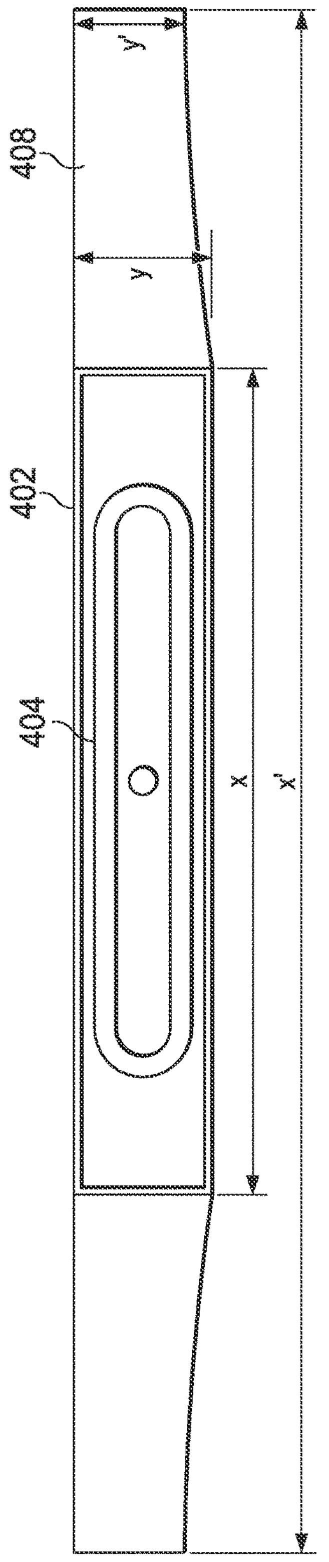
FIG. 5B illustrates an aspect ratio of the aperture of FIG. 5A, under some embodiments.

FIG. 5B illustrates an aspect ratio of the aperture of FIG. 5A, under an embodiment. Diagram 510 illustrates the waveguide portion (looking from the bottom up) with transducer 402 and diaphragm 404. The transducer portion 402 has a length dimension x along a longitudinal axis and a width dimension y along a transverse axis. The aspect ratio for this speaker is defined as the length of the speaker versus its width. As can be seen in the example of FIG. 5B, the length of the x dimension is significantly longer than that of the y dimension, so that the ratio of length to width (x/y) is a relatively high positive number. Likewise, the waveguide mouth 408 has an aspect ratio of x'/y'. Given that the width of the transducer and the waveguide mouth are identical or nearly the same (i.e., y is roughly equal to y'), the aspect ratio of the waveguide mouth 408 is greater than that of the transducer 402 itself since x' is greater than x, such that the aspect ratio is between 3-20, 5-10 or is 15. The relative difference in aspect ratios for the waveguide at the transducer and the waveguide mouth may tailored depending on the amount of flair and extension of the mouth above the transducer and may be e.g. 1.5-5 or 2-3 times larger.

The example configuration of FIG. 5A shows two fins 502*a* and 502*b* in the waveguide 406, which is typically not enough fins to ensure that the high frequency wavefront is widened under normal operation. The number, placement, and curvature of the fins can thus be changed to suit the particular waveguide configuration and operating conditions. Satisfactory high frequency response may be quantified based on a response the meets or exceeds a pre-defined threshold, such as maximum-3 dB above 4 kHz or any other appropriate frequency response.

A waveguide/fin configuration can be determined using a Finite Element Method simulation (or similar methods) to visualize the shape of the pressure wavefront moving up the waveguide at a frequency determined to have good directivity in a zero-fin configuration (e.g., 550 Hz). The fins can be designed according to the shape of the pressure flow lines predicted by the simulation. Specifically, the walls of the fins should be kept nominally perpendicular to the predicted wavefront along the length of the waveguide. Passages created by the row or lattice of fins can be spaced closely enough to ensure that the narrow pressure front at high frequencies is captured by many passages, and not just a couple in the center. The size of the passages between the fins can be made small enough such that any resonances produced by their internal reflection surfaces are above the frequency range of interest.

Figure 7:
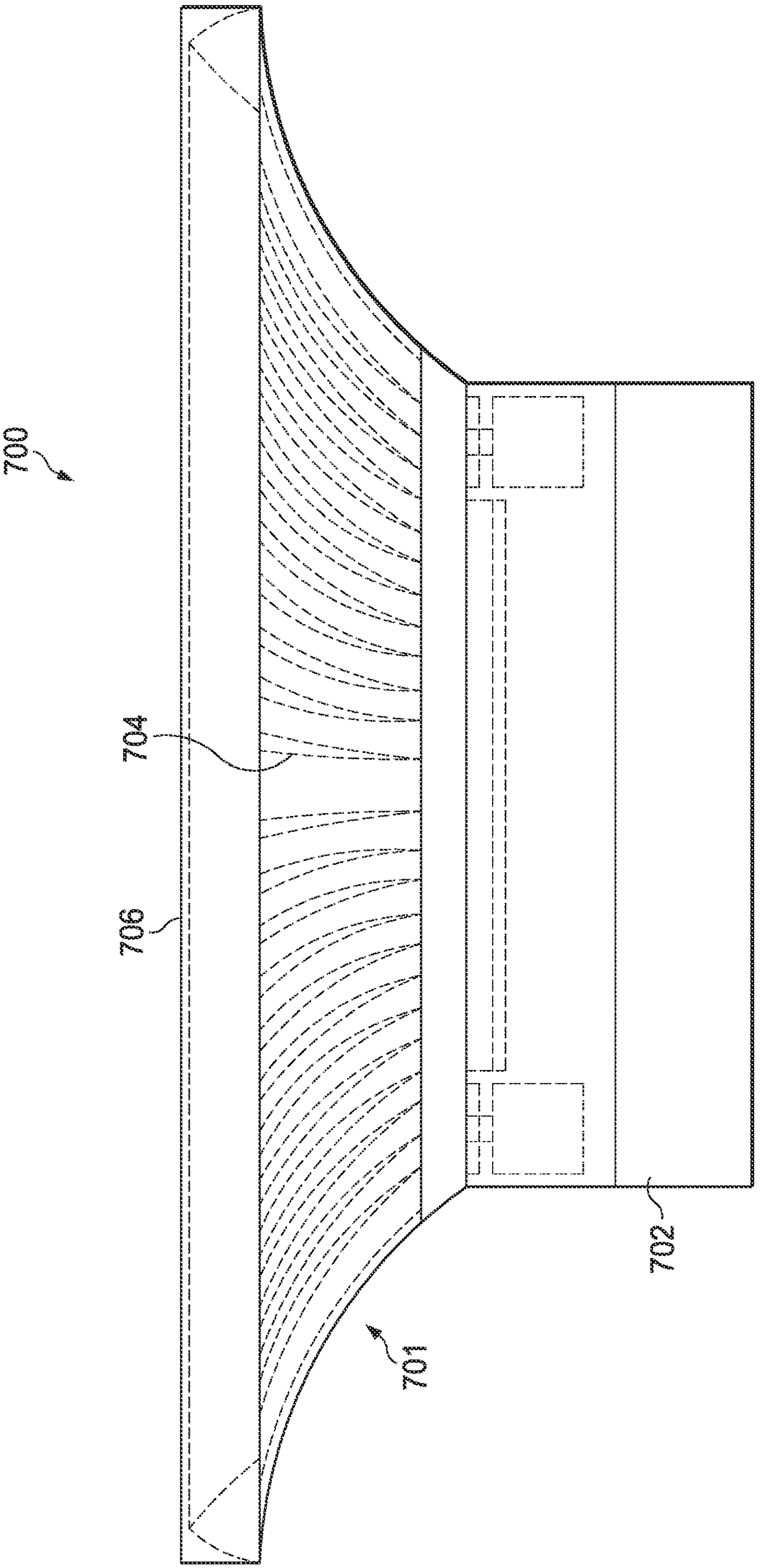
FIG. 7 illustrates an example narrow aperture speaker with a finned waveguide under an example embodiment.

FIG. 7 illustrates an example narrow aperture speaker 700 with a finned waveguide 701 mounted on a transducer 702, under some embodiments. As shown in FIG. 7, a relatively large number of transverse fins 704 are mounted within the waveguide and run perpendicularly to the axis of the aperture 706. In an embodiment, the fins 704 are formed by a front-to-back extrusion of their 2D section, as shown in dotted lines 704. As such they have a side to side curvature, as shown. The curvature is outward from the bottom mounting location of the fin above the diagram to the aperture 706. As shown in FIG. 7, this curvature is different for at least most of the fins, with the center fins less curved than the outer fins, and depends on the dimensions of the waveguide 701 and the amount of increasing cross sectional area over the vertical length of the waveguide.

The spacing between the transverse fins 704 may be equal or it may be different based on the fin position. For example, the central fins may be spaced slightly further apart relative to the spacing of the fins toward the outer portion of the waveguide. Furthermore, the transverse fins may be configured differently based on symmetry about the central vertical axis of the waveguide 701. The example of FIG. 7 shows a symmetrical configuration with the fins on the left and right side of the waveguide spaced and curved in equal but opposite directions to match the outer curvature of the waveguide. In another embodiment, the fins may be arrayed asymmetrically to further tailor the directivity of the soundwaves exiting aperture 706.

Figure 8:
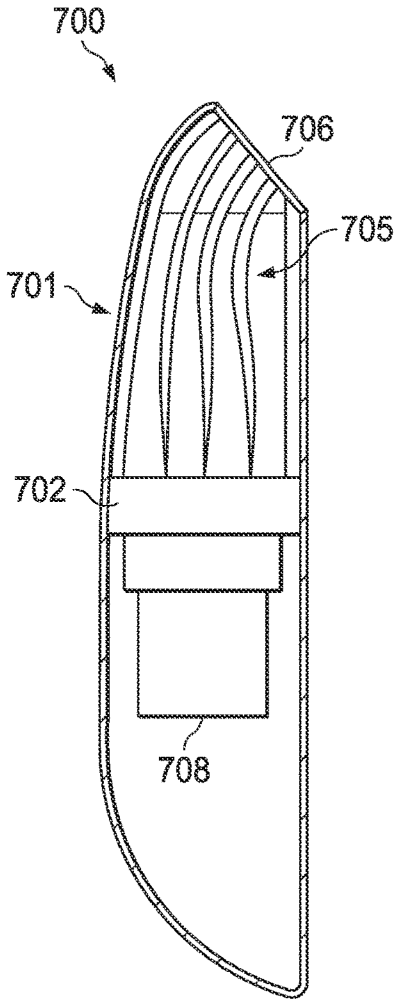
FIG. 8 is a side view of the speaker and waveguide of FIG. 7, under an example embodiment.

In an embodiment, a set of longitudinal fins can be provided in addition to the transverse fins 704. FIG. 8 is a side view of the speaker of FIG. 7, under an example embodiment. As shown in FIG. 8, speaker 700 includes a transducer portion 702 with resonator 708. The waveguide portion 701 extends up from the transducer and curves away from the vertical axis of the transducers as shown by the shape of the curved aperture 706. For clarity, the transverse fins 704 are not shown in this view, but waveguide 701 includes a number (e.g., 3) longitudinal fins 705 that run along the length of the aperture. These longitudinal fins have at least one curvature, such as to match the curvature of the aperture 706 relative to the axis of the transducer 702.

In an embodiment, the longitudinal fins begin upwards, then curve towards the aperture (to point at the user). Thus, the combination of the transverse and longitudinal fins produces sound passages formed by these two sets of fins that have two curvatures, one side-to-side, and the other back-to-front, where each set of fins provides one curvature. In other embodiments, one or both of the transverse or longitudinal fins may be formed in compound (multiple different) curve or linear fashion depending on the configuration of the waveguide and the desired directivity of the system.

Figure 9:
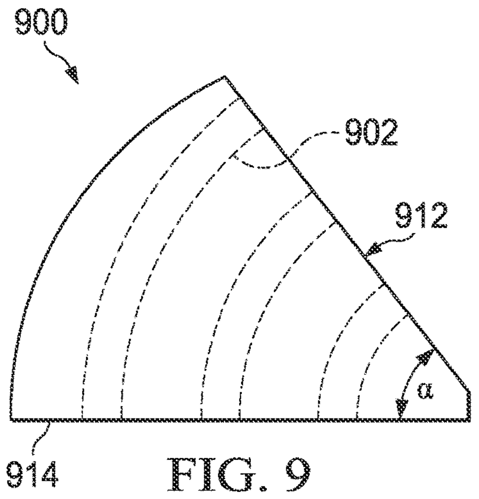
FIG. 9 is a close up side view of the aperture of the speaker of FIG. 8, under some embodiments.

As shown in FIG. 8, the curvature of the waveguide 701 is formed by the exit angle of the soundwaves out of the aperture 706. FIG. 9 is a close up view of the aperture of the speaker of FIG. 8, under some embodiments. The center axis of propagation in the vertical plane is perpendicular to the aperture plane 912. The aperture 900, which is shown having three longitudinal fins 902, is shaped as a triangle having an inclination angle $\alpha$ that defines the direction of soundwaves exiting the waveguide relative to the plane of the transducer diaphragm. The angle may vary depending on speaker configuration, display size, user distance and requirements and constraints. In general, an angle of between 40 degrees to 60 degrees between the aperture plane 912 and the driver diaphragm plane 914 is typical for most implementations.

Figure 10A:
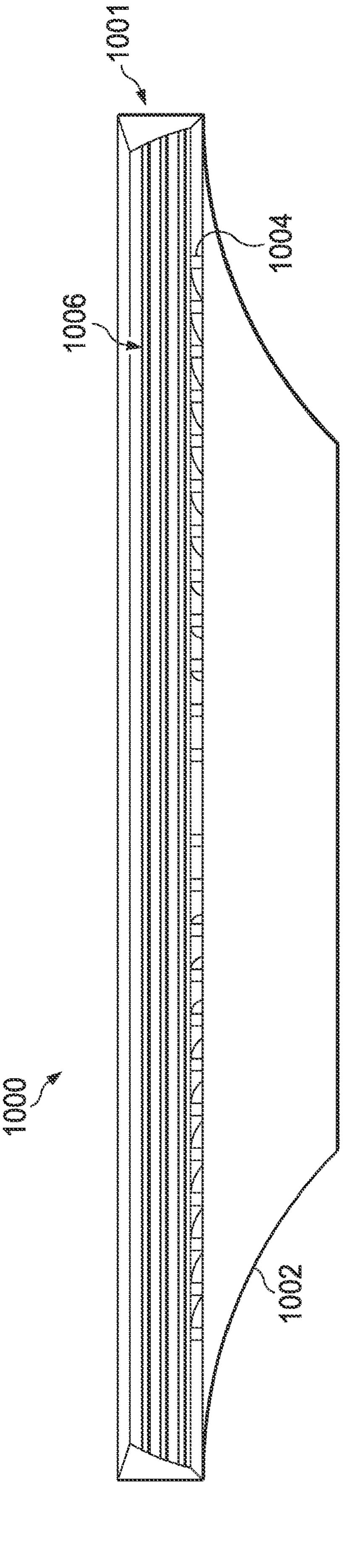
FIG. 10A is a view normal to the aperture plane of a waveguide showing a configuration of the longitudinal and transverse fins, under some embodiments.
Figure 10B:
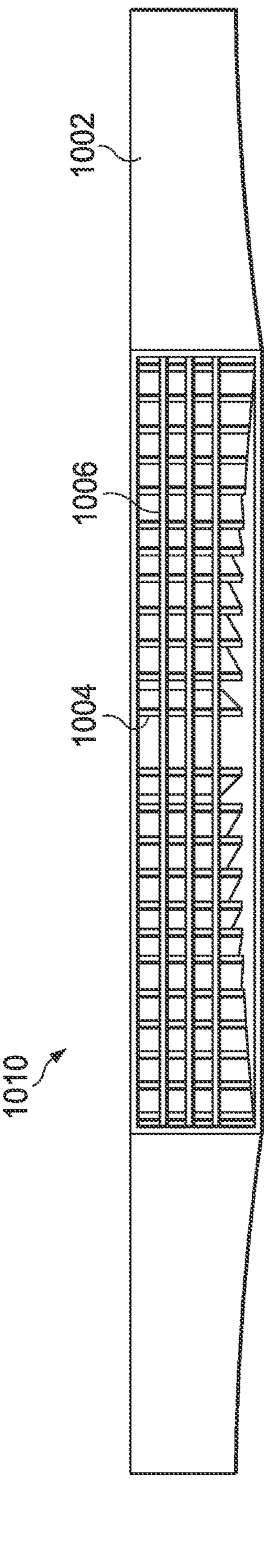
FIG. 10B is a bottom view of the array of fins of FIG. 10A and as viewed upward from the transducer.

FIG. 10A is a view normal to the aperture plane of a waveguide showing a configuration of the longitudinal and transverse fins, under some embodiments. The view 1000 of FIG. 10A shows the waveguide body 1002 with the top portion 1001 having transverse fins 1004 crisscrossed with longitudinal fins 1006. As shown in FIG. 10A, the waveguide is shaped such that it flares significantly outward as it goes up from the loudspeaker. FIG. 10B is a bottom view 1001 showing the array of fins 1004 and 1006 as viewed upward from the transducer. In this view the waveguide body 1002 extends upward and outward, as do the fins 1004 and 1006 that are arrayed within the waveguide.

Figure 11A:
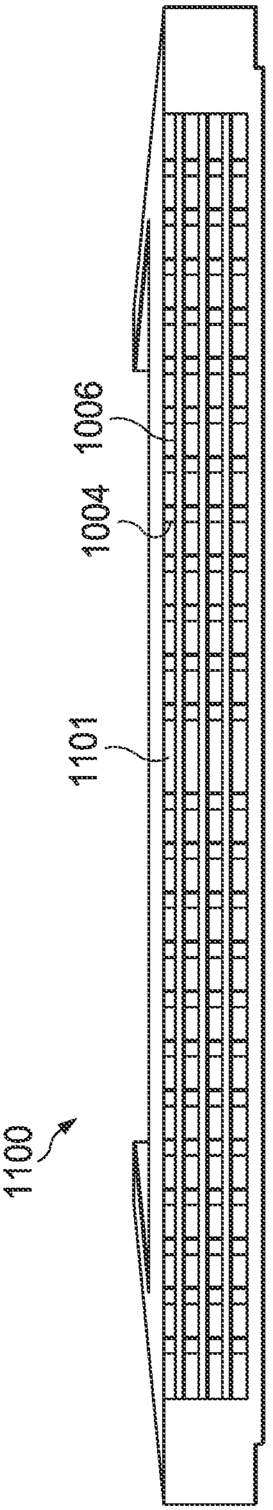
FIG. 11A is a more detailed, cutaway view of the waveguide top portion of FIG. 10A showing the formation of passages by the longitudinal and transverse fins.
Figure 11B:
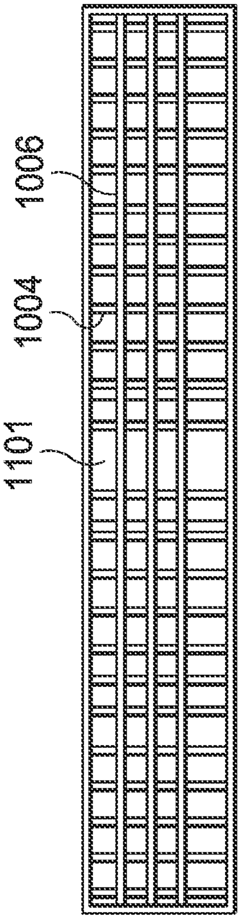
FIG. 11B is a more detailed cutaway view from the bottom of the sound passages made by the fins shown in FIG. 10B.

The use of both transverse and longitudinal fins create an array of tubular (rectangular or square cross-sectional) passages or separate smaller waveguides within the speaker waveguide 1002. FIG. 11A is a top view of the aperture 1000 of FIG. 10A, under an example embodiment. As shown in FIG. 11A, the aperture 1100 comprises a number of individual passages 1101 formed by the lattice created by transverse fins 1004 interlocked with longitudinal fins 1006. Any number and size of passages 1101 may be created depending on the number of transverse and longitudinal fins. FIG. 11B is a more detailed bottom view of the grid array of FIG. 10B showing passages 1101 and fins 1004, and 1006.

Any number of transverse and longitudinal fins can be used and the size and shape of the waveguide passages will change accordingly. For example, if no longitudinal fins are used, a series of columns parallel to the axis of the aperture and forming the passages 1101 will be created: if one longitudinal fin is used, two sets of columns will be created, and so on. The longitudinal fins may not be used to control directivity, but may instead be used to keep the passages 1101 small enough that standing wave resonances in the passages occur at frequencies above the range of interest. In other embodiments, however, these fins may also be used for control of directivity, at least in the vertical plane.

In general, the width of the speaker 700 is usually constrained to minimize the overall width of the combined panel/speaker combination, such as to fit as flush as possible against a wall or to maintain a desired industrial design/format, for example. The aspect ratio of the aperture 900 is defined by the width relative to the length. The aspect ratio is set by display panel Industrial Design (ID) constraint, and the need to maintain a constant or increasing cross sectional area along the length of the waveguide. For example, consider a case where the ID constraint is that the bezel may project a maximum of 7.5 mm above the screen, and for simplicity in this example, assume the aperture is not angled (e.g., FIG. 1A), but co-planar with the screen. Assume also that the waveguide has a cross section of 10 mm×40 mm at the interface between the transducer diaphragm and the waveguide throat, so that the cross-sectional area 400 $mm^2$. The aspect ratio of the exit aperture must be set such that its cross-sectional area is equal to or greater than 400 $mm^2$. Subtracting 2.5 mm from a total height allowance for the plastic wall thickness, gives a maximum aperture height of 5 millimeters. Therefore the aperture must be 5 mm high, and have a length greater than 80 mm. The dimensions described are for purposes of illustration only, and any other suitable dimensions may be used.

If the aperture cross-sectional area is equal to the cross-sectional area at the throat, no impedance matching will be provided and the waveguide will not provide sensitivity and efficiency gains. If such gains are desirable, the cross-sectional area should be increased.

In general, the aspect ratio of the waveguide exit has a high aspect ratio when compared with the aspect ratio of the transducer. In this way, the waveguide and passage (fin array) arrangement takes the wavefront produced by a short, squarish transducer (i.e., length y dimension not greatly exceeding its width x), lengthen it, then guide it around the (top) corner of the display panel, exiting out of an aperture that is of dimensions where the length y is substantially greater than x, as shown in the example of FIG. 10A.

It should be noted that any size display screen may be used, and generally, the size of the display does not dictate the size of the speakers, other than by imposing depth constraints due to the thinness of modern display panels. For multi-speaker applications, the length of the display panel may influence the spacing between the speakers, but the speakers may be positioned anywhere within or on the back surface of the display panel as appropriate. Furthermore, the top portion of the waveguide may be configured so that it protrudes slightly above the top edge of the panel, or it may be integrated within the top (or side or bottom) bezel of the display, in which case, a maximum allowable bezel area will also dictate the size of the speaker.

The aperture may be shaped into any appropriate shape, such as rectangular (as shown), trapezoidal, elliptical, or any other symmetrical or asymmetrical shape. Such a shape can be used to further control the directivity of the speaker. Other shapes may thus be employed to impart different directivity characteristics.

The directivity of the soundwaves 310 as they exit the waveguide is controlled by the fins inside the waveguide. The curvature of the fins is selected to lengthen the cylindrical wavefront of a speaker having a given size and dimension. The spacing of the fins is determined by the upper frequency limit of the content being reproduced. More specifically, the longest internal dimension of the passages between the fins must be shorter than a quarter-wavelength of the upper frequency limit to avoid internal resonances perturbing the frequency response in the range of interest. Specifically, then the longest dimension between internal walls in the fin-passages must be as follows: $S_{max}=c/f_{max}/4$, where: $S_{max}$ is the fin spacing (i.e., the maximum wall to wall dimension within the fin passages, c is the speed of sound (343 m/s in air), and $f_{max}$ is the upper limit of the frequency range within which the speaker must have a flat frequency response. $f_{max}$ may be typical frequencies that are audible by human ears and may e.g. be between 1-30 KHz, such as 5-20 kHz, 10-15 kHz, or around 12 kHz. This corresponds to a maximum wall to wall dimension within the fin passages between 2.6-86 mm, such as 4.3-17 mm, 5.7-8.6 mm, or around 7 mm. Thus, the width of the aperture and fin spacing, define the number of transverse fins.

Similar factors may be used to determine the configuration of any optional longitudinal fins, but as stated above, such fins are typically only used to form passages that minimize standing wave resonances, as opposed to pure directivity.

For the example of FIG. 7, the fin spacing is adequately dense enough to lengthen the cylindrical wavefront for a speaker of approximately two to three inches long and ½ inch wide. For such a speaker, experimental data for a radiation pattern plot indicates that the horizontal plane beam width at high frequencies is wide, and major nulls do not occur until 30° off-axis. At a distance of 600 mm from the screen, the listener's ears are approximately 17° off the speaker's center axis in the horizontal plane, so this directivity is generally acceptable.

The speaker of this example is approximately three inches by ½ inch in size at its largest dimensions (e.g., at the waveguide aperture). Speakers for use in typical present flat panel displays and to playback typical audio content used for such displays can be of that or similar dimensions. For other applications, such as larger displays, or even smaller displays, such as used for notebook computer, tablet computers, phones, and so on, these speaker dimensions may be scaled up or down as appropriate. In these applications, the primary dimension remains the speaker width, which is dictated by the width of the display panel enclosure, or the maximum amount of width that can be added to the panel by the speaker cabinet.

A number of design features may thus be defined to tailor the sound directivity and frequency response characteristics for the narrow aperture speaker. In general, the overall dimensions of the speaker will be dictated by the size and configuration of the display panel within which it is integrated, or to which it is attached. This sets the width of the speaker 400, and its length is then determined based on a desired or target aspect ratio of the transducer 402 and diaphragm 404. The waveguide configuration (size, shape, curvature, etc.) and aperture design (shape, aspect ratio, tilt angle, etc.) are then defined. Within the waveguide, the fin arrangement is then set for the transverse and optional longitudinal fins. The number, spacing, and curvature of the fins dictates the configuration of the passages 1101 that control the directivity of the soundwaves out of the waveguide aperture and around the top (or bottom or sides) of the display panel. Appropriate resonators 504_a_, 504_b_ may also be selected to minimize resonances created within the waveguide.

FIGS. 7 and 8 are provided for purposes of example only, and embodiments are not so limited to the speaker implementations shown. Any number and configuration of waveguides and included fins may be used depending on system requirements and constraints.

In general, any appropriate material may be used to fashion the fins 704 such as plastic, fiberglass, cardboard, and so on, to provide rigidity within the waveguide. The number, dimensions and shapes of the fins can vary depending on speaker configuration, waveguide configuration, and operational conditions, and any number and configurations of fins within the waveguide may be used.

In an embodiment, the narrow aperture speaker 400 may be provided as one of a pair of speakers for a stereo implementation, such as shown in FIG. 2. Embodiments, are not so limited however, and any number of speakers may be used depending on the audio playback requirements. Moreover, the speakers may be mounted to direct sound out of any edge of the display panel 202, such as the top edge, as shown in FIG. 2, or the side edges or even the bottom edge.

Figure 12:
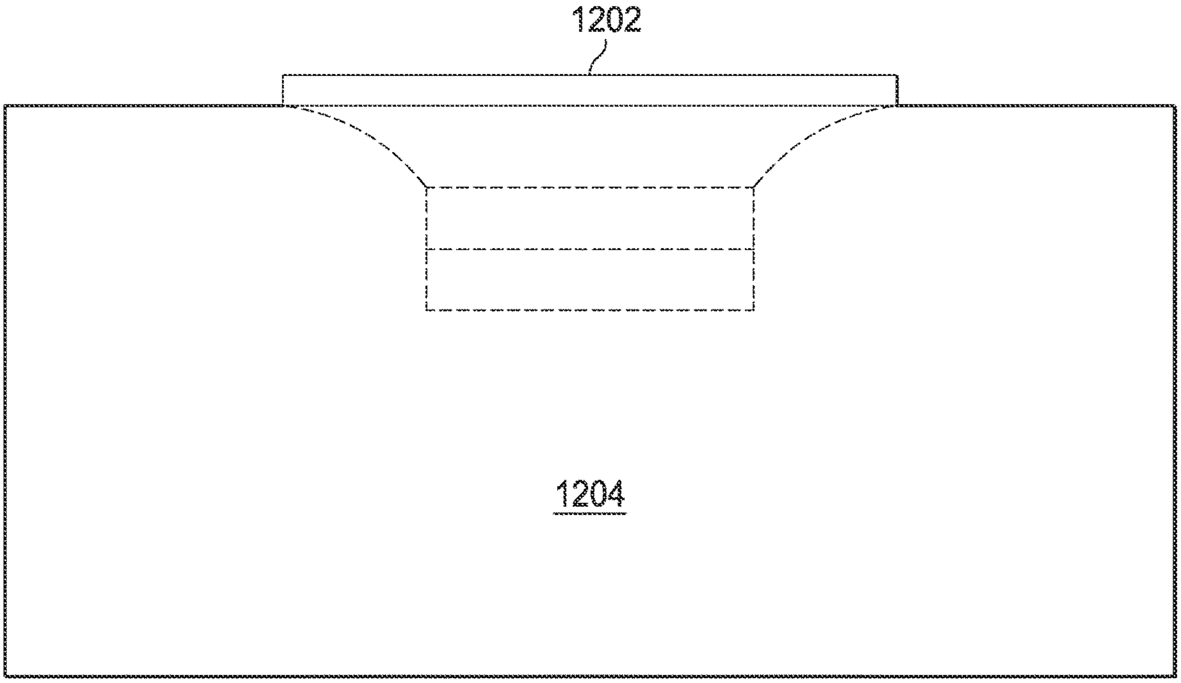
FIG. 12 illustrates a display panel having a single narrow aperture speaker in an example embodiment.

Although embodiments have been described with respect to a stereo application using two speakers for a computer display, the speaker may be provided as a single speaker, such as in a soundbar configuration, or a single unitary cabinet having multiple transducers. FIG. 12 illustrates a display panel having a single narrow aperture speaker in an example embodiment. For the example of FIG. 12, a single speaker 1202 is mounted to the upper central area of the backside of display panel 1204. This single speaker 1202 may be embodied as speaker 700, for example.

Figure 5C:
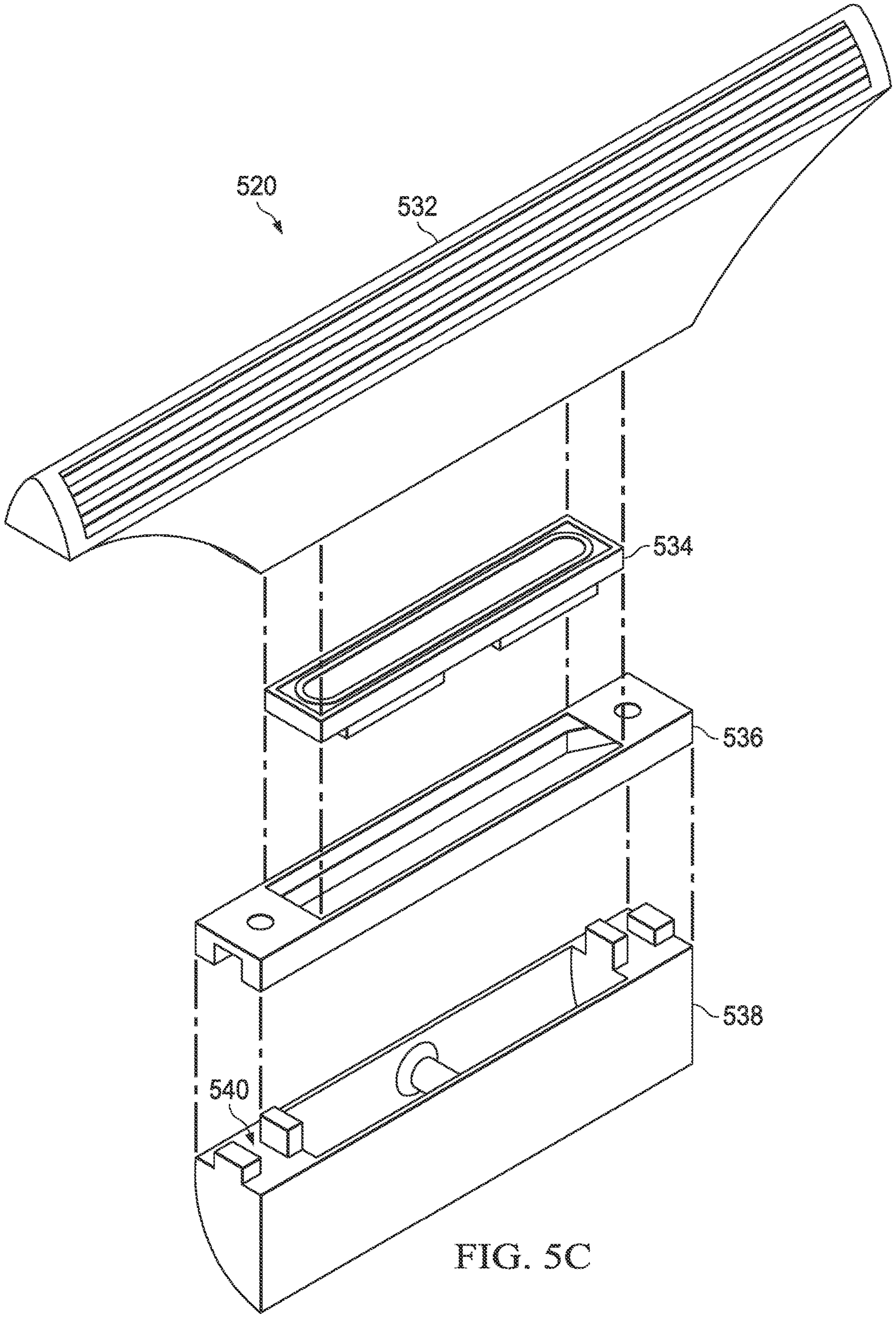
FIG. 5C illustrates an assembly of components for the speaker of FIG. 5A, under an example embodiment.

As shown in the example embodiment of FIG. 1B, the narrow aperture speaker or speakers are integrated with or manufactured as part of the display panel, in which case the panel and speakers are provided as a single unitary product. In some cases, parts of the speakers, such as the grill or maybe part of the cabinet may be provided as external or semi-external units (as shown in FIG. 1A). The speaker itself may be assembled in any appropriate manner. FIG. 5C illustrates an assembly of components for the speaker of FIG. 5A, under an example embodiment. For this embodiment, the speaker comprises a housing or enclosure 538 for the transducer that includes chambers 540 or formed sections for the resonators. A frame 536 for the transducer is attached to the housing 538 and holds the transducer/diaphragm assembly 534. Waveguide 532 is then attached to the speaker body comprising enclosure 538, transducer frame 536 and transducer/diaphragm 534. The waveguide 532 may have an array of transverse and/or longitudinal fins forming the array of passages, as shown. The constituent components of speaker assembly 520 may be joined together through any appropriate means, such as glue, nails, screws, bonding, and so on.

At least some components of the speaker assembly 520 may be provided as an external speaker that is mounted to the back surface of the display panel, or they may be provided as an assembly that is integrated into the display panel, such as in portion of the interior volume of the display panel body or housing. In this case, one or more components may be built-in or molded into the display panel housing as appropriate or required for manufacture of display panels.

Embodiments of the speaker with narrow aperture described herein may be used to playback any appropriate audio content, such as mono, stereo, or multi-channel surround sound audio. Embodiments may also be used to playback spatial or immersive audio content having height channels, such as the Dolby® Atmos® system. The speaker may be used in conjunction with any appropriate rendering system for playback of audio for computer systems, televisions, home entertainment or other audio content.

Unless the context clearly requires otherwise, throughout the description and the claims, the words "comprise," "comprising," and the like are to be construed in an inclusive sense as opposed to an exclusive or exhaustive sense. Words using the singular or plural number also include the plural or singular number respectively. When the word "or" is used in reference to a list of two or more items, that word covers all of the following interpretations of the word: any of the items in the list, all of the items in the list and any combination of the items in the list.

While one or more implementations have been described by way of example and in terms of the specific embodiments, it is to be understood that one or more implementations are not so limited. The description is intended to cover various modifications and similar arrangements as would be apparent to those skilled in the art. Therefore, the scope of the appended claims should be accorded the broadest interpretation so as to encompass all such modifications and similar arrangements.

Various aspects of the present invention may be appreciated from the following enumerated example embodiments (EEEs):

EEE1. A speaker comprising:
- a transducer;
- a waveguide attached to the transducer, and having an increasing cross sectional aspect ratio and area; and
- an aperture portion formed with the waveguide and comprising a curved tube section configured to direct soundwaves around an edge of a display panel housing the speaker and substantially directly to a listener positioned in front of the display panel.

EEE2. The speaker of EEE 1 wherein the aperture protrudes above the edge of the display panel, and has an aspect ratio greater than that of the transducer, where the aspect ratio is a length of an object relative to its width.

EEE3. The speaker of EEEs 2 or 3 wherein the waveguide includes fins that control the directivity of soundwaves exiting the waveguide and around the edge of the display panel.

EEE4. The speaker of EEE 3 wherein the fins form a plurality of passages within the waveguide that are configured to direct the soundwaves around the edge of the flat panel display substantially perpendicular to a front surface of the flat panel display when the transducer is attached to the flat panel display in an outward firing configuration.

EEE5. The speaker of EEE 4 wherein the fins comprise a fin array including a first set of fins arrayed transversely along an axis perpendicular to a longitudinal axis of the transducer, each having a first curvature corresponding to increasing cross sectional aspect ratio of the waveguide, and a second set of fins arrayed longitudinally parallel to the longitudinal axis of the transducer and having a second curvature corresponding to the inclination angle of the aperture curved tube section.

EEE6. The speaker of any of EEEs 1 to 5 further comprising a resonator in the transducer to minimize a resonance in the waveguide, wherein the resonator comprises one of a Helmholtz resonator or a quarter wave resonator.

EEE7. A speaker for transmitting sound from the rear of a flat display panel in a substantially forward firing direction, comprising:
- an enclosure configured to be integrated into or mounted on the display panel;
- a transducer installed in the enclosure and configured to radiate sound out of a surface of the enclosure and outwards around an edge of the display panel when the transducer is positioned proximate the edge of the display panel; and
- a curved waveguide having a narrow aperture and mounted on the transducer and configured to radiate the sound around an edge of the display panel to form soundwaves directed toward a listener positioned in front of the display panel.

EEE8. The speaker of EEE 7 wherein the waveguide comprises a curved tube section having an increasing cross sectional aspect ratio, and an area increasing in proportion to a distance from the transducer, and further wherein the waveguide further comprises an aperture having an aspect ratio greater than that of the transducer, where the aspect ratio is a length of an object relative to its width, and yet further wherein the aperture comprises a curved tube section protruding above the edge of the display panel.

EEE9. The speaker of any of EEEs 7 or 8, wherein the edge comprises a top edge of the display panel, and wherein the enclosure comprises a structure formed within a portion of an interior volume of the display panel, and further wherein the display panel comprises a flat panel display screen for use with a desktop computer viewed by a user positioned approximately two to five feet in front of the display panel, and wherein the enclosure is not more than one-half inch wide.

EEE10. The speaker of any of EEEs 7 to 9 wherein the enclosure includes a resonator to minimize resonance created within the waveguide, and wherein the resonator comprises a quarter wave resonator or a Helmholtz resonator, and optionally includes a damping material in a resonance cavity.

EEE11. The speaker of EEE 8, wherein the curved tube section is at an inclination angle of between 40 degrees and 60 degrees from a plane perpendicular to the display panel.

EEE12. The speaker of EEE 11, wherein the waveguide includes a first set of fins arrayed transversely along an axis perpendicular to a longitudinal axis of the transducer, each having a first curvature corresponding to increasing cross sectional aspect ratio and area of the waveguide.

EEE13. The speaker of EEE 12 wherein the waveguide includes a second set of fins arrayed longitudinally parallel to the longitudinal axis of the transducer and having a second curvature corresponding to the inclination angle.

EEE14. The speaker of EEE 13 wherein the first set of fins and the second set of fins form a plurality of passages extending from the transducer and through the waveguide to direct the soundwaves over the edge of the display panel to produce audio perceived as emanating from the front surface of the display panel, and wherein the waveguide and fins are configured to produce a high frequency audio response exceeding a defined threshold.

EEE15. A method comprising:

- combining a speaker with a flat panel display, the speaker comprising a transducer and diaphragm assembly;
- providing with the transducer, a waveguide having an increasing cross sectional aspect ratio and area, the waveguide further having an aperture portion comprising a curved tube section having a sound opening with a high aspect ratio profile of length versus width; and
- configuring the speaker to direct soundwaves produced by the transducer around an edge of the display panel substantially toward a listener positioned in front of the display panel.

EEE16. The method of EEE 15 wherein the speaker is provided in an enclosure attachable to a rear surface of the flat panel display or integrable within the flat panel display to become a structure formed within an interior volume of the flat panel display panel, and further wherein the flat panel display is used with a desktop computer viewed by a user positioned approximately two to five feet in front of the display panel, and wherein the flat panel display is not more than one-half inch wide.

EEE17. The method of EEE 15 further comprising providing a resonator in the enclosure to minimize a resonance in the waveguide, wherein the resonator comprises one of a Helmholtz resonator or a quarter wave resonator.

EEE18. The method of any of EEEs 15 to 17 further comprising forming, within the waveguide, a plurality of passages directing the soundwaves around the edge of the flat panel display substantially perpendicular to a front surface of the flat panel display when the transducer is attached to the flat panel display in an outward firing configuration.

EEE19. The method of EEE 18 wherein the waveguide includes a first set of fins arrayed transversely along an axis perpendicular to a longitudinal axis of the diaphragm, each fin of the first set of fins having a first curvature corresponding to increasing cross sectional aspect ratio of the waveguide.

EEE20. The method of EEE 19 wherein the waveguide includes a second set of fins arrayed longitudinally parallel to the longitudinal axis of the transducer, each fin of the second set of fins having a second curvature corresponding to an inclination angle of the aperture curved tube section.

The invention claimed is:

1. A speaker comprising:

- a transducer;
- a waveguide attached to the transducer, and having an increasing cross sectional aspect ratio and an increasing cross sectional area, both the cross sectional aspect ratio and cross sectional area increasing as the waveguide extends away from the transducer; and
- an aperture portion formed with the waveguide wherein the aperture portion comprises a curved section configured to direct soundwaves around an edge of a display panel housing the speaker and substantially directly to a listener positioned in front of the display panel;
- wherein the waveguide includes fins that control the directivity of soundwaves exiting the waveguide and around the edge of the display panel, and wherein the fins form a plurality of passages within the waveguide that are configured to direct the soundwaves around the edge of the display panel substantially perpendicular to a front surface of the display panel when the transducer is attached to the display panel in an outward firing configuration and the maximum wall to wall dimension within said plurality of passages formed by the fins is defined by $c/f_{max}/4$, wherein c is the speed of sound and $f_{max}$ is an upper limit of the frequency range within which the speaker has a flat frequency response.

2. The speaker of claim 1 wherein the aperture protrudes beyond the edge of the display panel, and has an aspect ratio greater than that of the transducer, where the aspect ratio is a length of an object relative to its width.

3. The speaker of claim 1 further comprising a resonator in the transducer to minimize a resonance in the waveguide, wherein the resonator comprises one of a Helmholtz resonator or a quarter wave resonator.

4. The speaker of claim 1 wherein the fins have an increasing thickness as the waveguide extends away from the transducer.

5. The speaker of claim 1 wherein the fins comprise a fin array including a first set of fins arrayed transversely along an axis perpendicular to a longitudinal axis of the transducer, each having a first curvature corresponding to the increasing cross sectional aspect ratio of the waveguide.

6. The speaker of claim 5 wherein the fin array comprises a second set of fins arrayed longitudinally parallel to the longitudinal axis of the transducer and having a second curvature corresponding to the inclination angle of the aperture curved section.

7. The speaker of claim 1 further comprising an enclosure enclosing the transducer and at least part of the waveguide.

8. The speaker of claim 7 wherein the enclosure is configured to be mounted in a housing of the display panel to be integrated within an interior volume of the display panel with the aperture protruding beyond the edge of the display panel.

9. The speaker of claim 7 wherein the enclosure is configured to be mounted onto a back surface of the display panel to form an exterior speaker with the aperture protruding beyond the edge of the display panel.

10. The speaker of claim 7, wherein the edge comprises a top edge of the display panel, and/or wherein the display panel comprises a display screen for use with a desktop computer viewed by a user positioned approximately two to five feet in front of the display panel, and/or wherein the enclosure is not more than one-half inch wide.

11. A method comprising:

combining a speaker having a transducer with a display panel;

providing, with the transducer, a waveguide having an increasing cross sectional aspect ratio and an increasing cross sectional area, both the cross sectional aspect ratio and cross sectional area increasing as the waveguide extends away from the transducer;

providing an aperture portion formed with the waveguide, wherein the aperture portion comprises a curved section configured to direct soundwaves around an edge of the display panel and substantially directly to a listener positioned in front of the display panel; and forming, within the waveguide, a plurality of fins forming a plurality of passages directing the soundwaves around the edge of the display panel substantially perpendicular to a front surface of the display panel when the transducer is attached to the display panel in an outward firing configuration, wherein the maximum wall to wall dimension within said plurality of passages formed by the fins is defined by $c/f_{max}/4$, wherein c is the speed of sound and $f_{max}$ is an upper limit of the frequency range within which the speaker has a flat frequency response.

12. The method of claim 11 wherein the speaker is provided in an enclosure attachable to a rear surface of the display panel or integrable within the display panel to become a structure formed within an interior volume of the display panel, and/or wherein the display panel is used with a desktop computer viewed by a user positioned approximately two to five feet in front of the display panel, and/or wherein the display panel is not more than one-half inch wide.

13. The method of claim 12 further comprising providing a resonator in the enclosure to minimize a resonance in the waveguide, wherein the resonator comprises one of a Helmholtz resonator or a quarter wave resonator.

14. The method of claim 11 further comprising simulating a shape of a pressure wavefront moving along the waveguide at a predetermined frequency in a zero-fin configuration and wherein forming fins comprises forming walls of the fins that are nominally perpendicular to the simulated wavefront along the length of the waveguide.

15. The method of claim 11 wherein the waveguide comprises:

a first set of fins arrayed transversely along an axis perpendicular to a longitudinal axis of the transducer, each fin of the first set of fins having a first curvature corresponding to increasing cross sectional aspect ratio of the waveguide; and a second set of fins arrayed longitudinally parallel to the longitudinal axis of the transducer, each fin of the second set of fins having a second curvature corresponding to an inclination angle of the aperture curved section.

* * * * *